United States Patent [19]
Han

[11] Patent Number: 6,047,003
[45] Date of Patent: Apr. 4, 2000

[54] FRAMING IDENTIFICATION AND TIMING SIGNAL EXTRACTION APPARATUS FOR VERY SMALL APERTURE TERMINAL SYSTEM AND METHOD THEREOF

[75] Inventor: Byong-Eun Han, Seoul, Rep. of Korea

[73] Assignee: Hyundai Electronics Industries Co., Inc., Rep. of Korea

[21] Appl. No.: 08/745,004

[22] Filed: Nov. 7, 1996

Related U.S. Application Data

[63] Continuation-in-part of application No. 08/362,841, Dec. 22, 1994, abandoned.

[30] Foreign Application Priority Data

Dec. 27, 1993 [KR] Rep. of Korea ............... 93-29733

[51] Int. Cl.[7] ......................................... H04J 3/06
[52] U.S. Cl. ............................ 370/509; 455/13.2
[58] Field of Search ............... 342/352; 340/825.21; 375/356; 455/12.1, 13.2, 7, 13.1, 507, 508, 427, 428, 430; 370/509, 315, 316, 324, 325, 327, 350, 379, 382, 383

[56] References Cited

U.S. PATENT DOCUMENTS

| | | | |
|---|---|---|---|
| 4,707,827 | 11/1987 | Bione et al. | 370/405 |
| 4,775,974 | 10/1988 | Kabayashi | 370/95.1 |
| 4,901,313 | 2/1990 | Fujkura et al. | 370/104.1 |
| 4,995,055 | 2/1991 | Weinberger et al. | 375/216 |
| 5,003,534 | 3/1991 | Gerhardt et al. | 370/322 |
| 5,012,469 | 4/1991 | Sardana | 370/104.1 |
| 5,053,883 | 10/1991 | Johnson | 348/505 |
| 5,144,314 | 9/1992 | Malmberg et al. | 342/44 |
| 5,245,612 | 9/1993 | Kachi et al. | 370/324 |
| 5,276,839 | 1/1994 | Robb et al. | 364/245.7 |
| 5,296,861 | 3/1994 | Knight | 342/357.11 |
| 5,301,194 | 4/1994 | Seta | 370/104.1 |
| 5,331,570 | 7/1994 | Bershteyn | 364/489 |
| 5,347,559 | 9/1994 | Hawkins et al. | 377/54 |
| 5,392,450 | 2/1995 | Nossen | 370/104.1 |
| 5,511,079 | 4/1996 | Dillon | 714/776 |

*Primary Examiner*—Dang Ton
*Assistant Examiner*—Phirin Sam
*Attorney, Agent, or Firm*—Lawrence G. Kurland; Bryan Cave LLP

[57] ABSTRACT

An improved framing identification and timing signal extraction apparatus for a very small aperture terminal system and a method thereof, which includes a clock signal divider for dividing a clock signal inputted and an inverter delay clock signal into a predetermined number of signals, generating a dividing signal having a different frequency, and an output enable signal and a write enable signal, a first memory for storing and outputting a predetermined data by using one dividing signal among the dividing signals outputted from the clock divider as its address signal, a second memory for receiving the output signal from the first memory and the divider as an address signal, converting the state by using the received address signal, and outputting a corresponding state value, and a control logic unit for extracting a control signal and a framing identification and timing (FIT) data in accordance with the output from the second memory and the control signal from the divider.

15 Claims, 6 Drawing Sheets

FRAMING IDENTIFICATION AND TIMING SIGNAL EXTRACTION APPARATUS FOR VERY SMALL APERTURE TERMINAL SYSTEM AND METHOD THEREOF

This is a continuation-in-part of U.S. Application Ser. No. 08/362,841, filed Dec. 22, 1994, now abandoned.

BACKGROUND OF THE INVENTION

1. Field of the Invention

The present invention relates to a framing identification and timing signal extraction apparatus for a very small aperture terminal(VSAT) system and a method thereof, and particularly to an improved framing identification and timing signal extraction apparatus for a very small aperture terminal system and a method thereof which are capable of directly extracting three kinds of framing identification and timing (FIT) signals from a user terminal for a synchronization between a central unit and a terminal unit, for thus using the FIT signals for a synchronization of the system wherein the very aperture terminal system for communicating a predetermined information between a user terminal and a main frame of a central unit which are connected to a plurality of terminal units by using a satellite.

2. Description of the Conventional Art

FIG. 1 is a block diagram illustrating a very small aperture terminal system.

As shown therein, a central unit 1 is connected for controlling the operation of all networks by using a satellite. A plurality of terminal units 2 are connected for performing communication operation through the central unit 1. A network management system 3 is connected for controlling an information communication between the central unit 1 and the terminal systems 2. A main frame 4 is connected with the central unit 1 for storing information to be transmitted through network lines.

Here, in the very small aperture terminal system, a data is transmitted by a carry signal or a plurality of continuous carry signals from the central unit 1 to the terminal units 2. This data is conventionally called an outbound data.

In addition, the terminal units 2 share one carry signal and transmit a predetermined data to the central unit 1. Here, this data is called an inbound data.

Here, various channel access protocols are used so that the plurality of the terminal units 2 share one input type carry. The most commonly used channel access protocols are a random aloha and a slotted aloha.

Meanwhile, the data packet transmitted to the terminal units 2 from the central unit 1 has two different types of information.

The first type of information is user data communicated between the central unit 1 and the terminal units 2. The carrier of one outbound has a plurality of user data.

The second type of information is a synchronous information signal for a signal transmission apparatus.

This information signal is a bit signal such as framing bits, identification bits, and timing bits and is generated by a modulator (not shown) of the central unit 1. This bit signal is extracted from the receiver (not shown) of the terminal unit 2. The thusly extracted bit signal is used for a synchronization for transmitting a burst data to the central unit 2.

FIG. 2 is a view illustrating the construction of a bit signal of a framing identification and timing (FIT) signal according to the present invention. As shown therein, framing bits F8 through F0 among bit signals as shown in FIG. 2 are formed in a 9-bit form of "011111111" which was the fitted value upon transmission at the central unit 1. These framing bits F8 through F0 are used for separating the FIT information and the user data from the data packet inputted to the terminal unit 2.

Identification bits I8 through I0 are used for searching outbound carrier used in the specific terminal unit among a plurality of outbound carriers.

The timing bits T8 through T0 denote one slot among 0–99 slots. The timing bits are used for synchronizing slots to entire terminal units.

Namely, as shown in FIG. 2, each FIT bit has 9 bits. There are 25 bits between each FIT bit. 25 bits comprise 1 FIT bit and 24-bit user data. There are 75 bits between F0 bit and F1 bit. Accordingly, there are 695 bits between F0 bit and T9 bit. The clock period between F0 and I0 is 0.38 ms. (2.666 KHz). The clock period between F0 and F1 is 1.13 ms. (0.888 KHz). Therefore, the entire synchronizing clock time is 10.17 ms. The FIT signal and user data are loaded in carrier frequency.

However, since the conventional very small aperture terminal system is not directed to directly extracting the FIT signal from a user terminal 5, there may be many limitations in using the user terminal 5.

SUMMARY OF THE INVENTION

Accordingly, it is an object of the present invention to provide a framing identification and timing signal extraction apparatus for a very small aperture terminal system and a method thereof which overcomes the problems encountered in the conventional art.

It is another object of the present invention to provide an improved framing identification and timing signal extraction apparatus for a very small aperture terminal system and a method thereof which make it possible to directly extract three kinds of framing identification and timing (FIT) signals from a user terminal for a synchronization between a central unit and a terminal unit, for thus using the FIT signals for a synchronization of the system wherein the very aperture terminal system for communicating a predetermined information between a user terminal and a main frame of a central unit which are connected to a plurality of terminal units by using a satellite.

To achieve the above objects, there is provided a framing identification and timing signal extraction apparatus for a very small aperture terminal system which includes a clock signal divider for dividing a clock signal inputted and an inverter delay clock signal into a predetermined number of signals, generating a dividing signal having a different frequency, and an output enable signal and a write enable signal, a first memory unit for storing a predetermined data into itself in response to one of its outputs, one of the clock signal divided signals from said dividing part, function as its address, simultaneously with performing of output operation on a stored data, a second memory for receiving the output signal from the first memory and the divider as an address signal, converting the state by using the received address signal, and outputting a corresponding state value, and a control logic unit for extracting a control signal and a framing identification and timing (FIT) data in accordance with the output from the second memory and the control signal from the divider.

To achieve the above objects, there is provided a framing identification and timing signal extraction method for a very small aperture terminal system which includes the steps of extracting a FIT signal which is three sub-channels which were generated by a central unit so that the communication synchronization between the central unit and a terminal station is performed, searching an identification bit from the FIT signal extracted, and synchronizing the timing from the FIT signal extracted.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Referring to FIGS. 3 through 7, a framing identification and timing signal extraction apparatus for a very small aperture terminal system and method thereof according to the present invention will now be explained.

Figure 3:
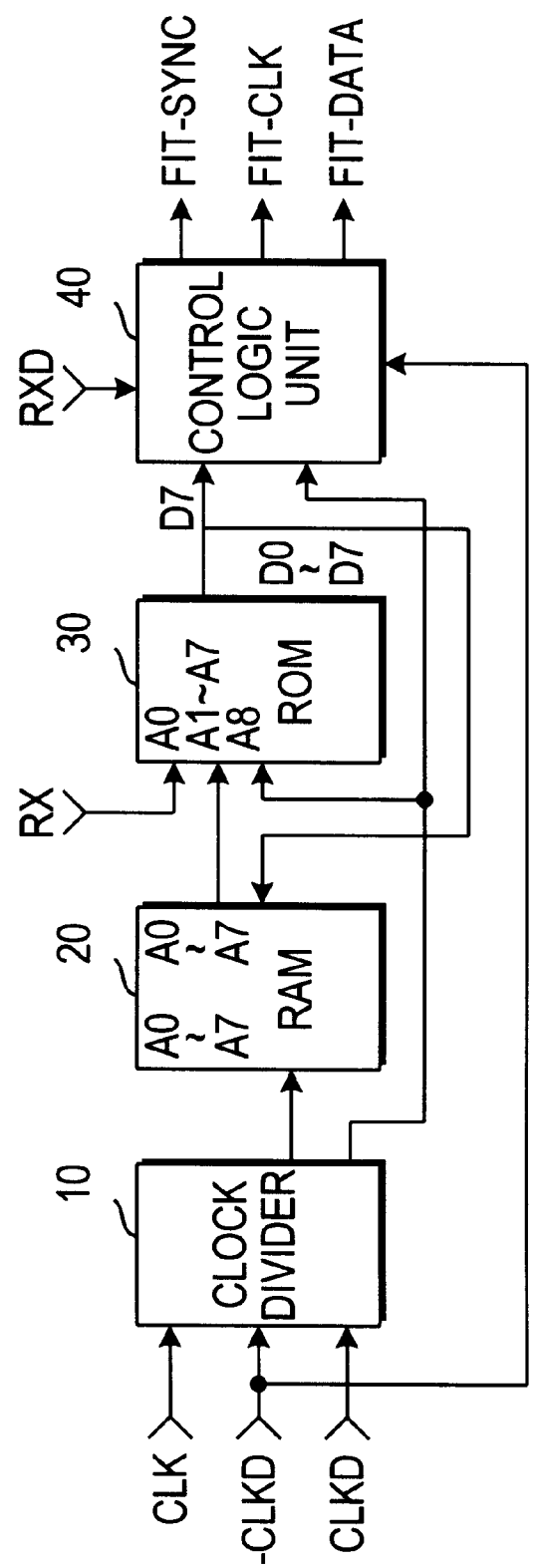
FIG. 3 is a block diagram illustrating a FIT signal extraction apparatus for a very small aperture terminal system according to the present invention.
Figure 4:
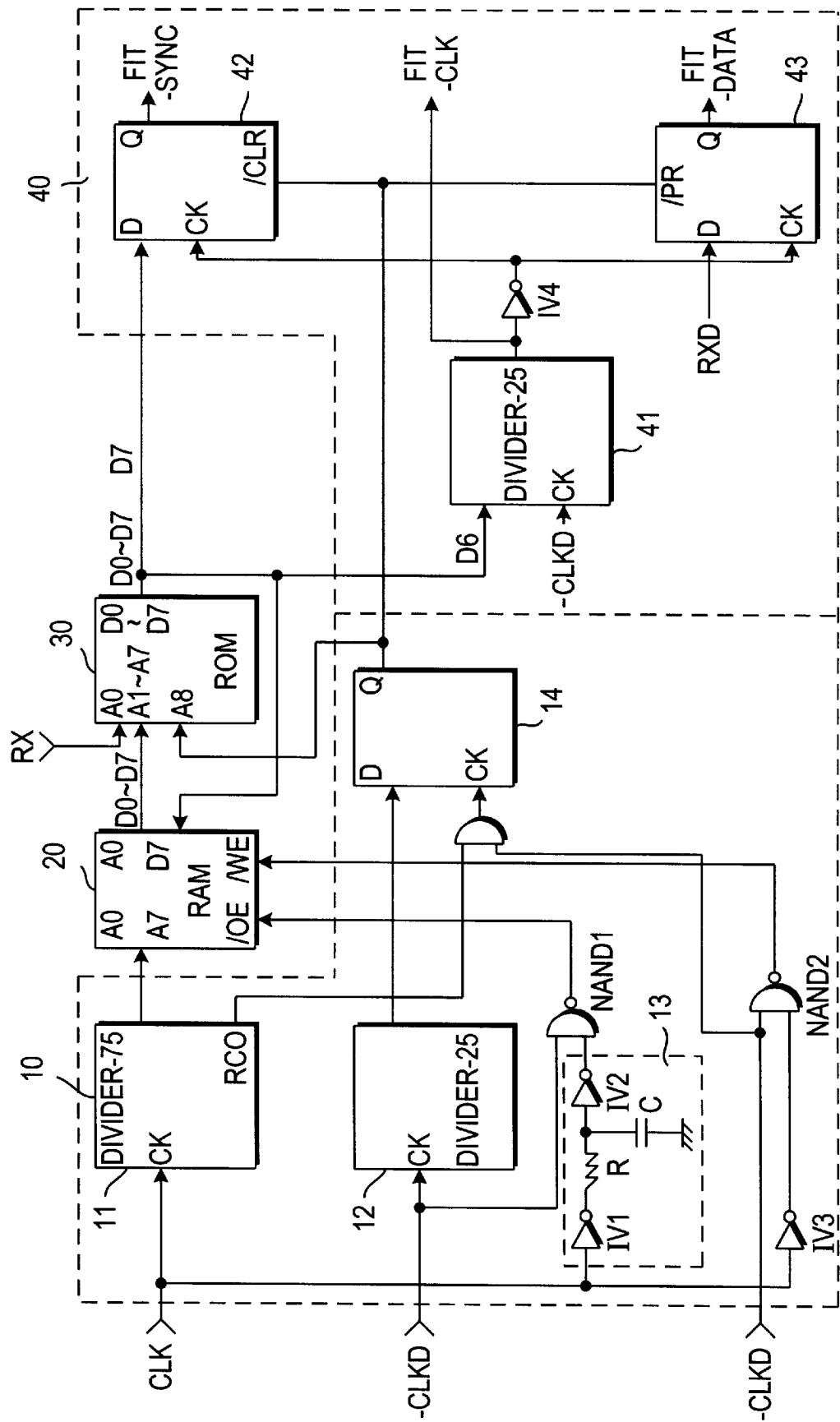
FIG. 4 is a detailed block diagram illustrating a FIT signal extraction apparatus for a very small aperture terminal system according to the present invention.
Figure 5:
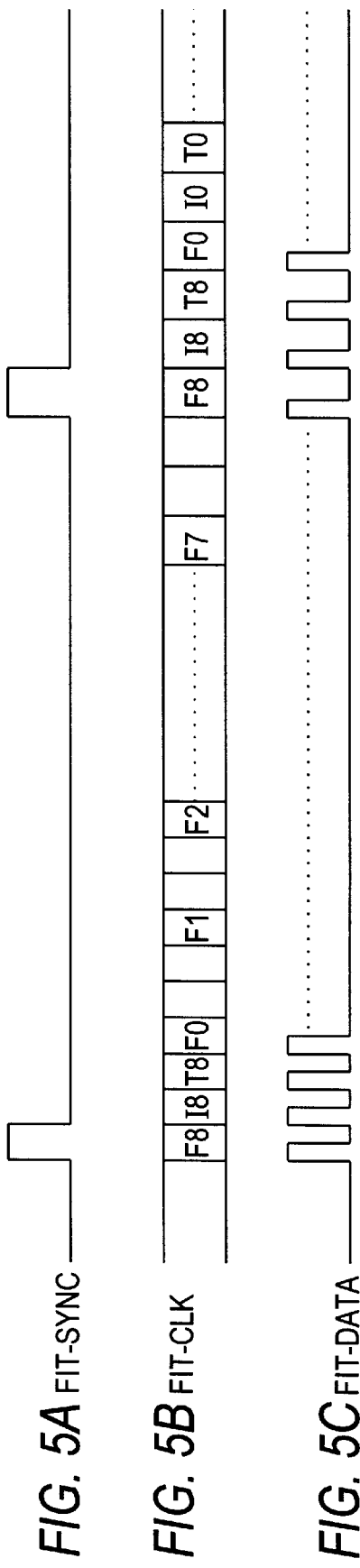
FIGS. 5A through 5C are views illustrating an operation of a FIT signal of FIGS. 3 and 4 according to the present invention.

First, FIG. 3 is a block diagram illustrating a FIT signal extraction apparatus for a very small aperture terminal system according to the present invention, and FIG. 4 is a detailed block diagram illustrating a FIT signal extraction apparatus for a very small aperture terminal system according to the present invention.

As shown therein, a clock divider 10 is connected for dividing a clock signal of 66.666 KHz into 75 signals, generating a control signal by dividing an inverted delay clock signal/CLKD of 66.666 KHz into 25 signals, and generating an output enable signal/OE and a write enable signal/WE. A random access memory (RAM) 20 is connected for storing a data applied to data terminals D0 through D7 in accordance with an address signal of 75 divided signals outputted from the clock divider 10. A read only memory (ROM) 30 is connected for receiving a transmission data RX as one address signal, and a data outputted from output terminals D0 through D6 of the RAM 20 and an output signal outputted from the clock divider 10 as an address signal, and for outputting a state value in accordance with an operation thereof. A control logic unit 40 is connected for outputting a FIT clock signal FIT-CLK by dividing the inverted delay clock signal/CLKD into 25 signals, a signal from an output terminal D7 of the ROM as a FIT synchronous signal FIT-SYNC in accordance with a signal which controls the output of a FIT signal the clock divider 10 outputs, and a delay transmission data RXD as a FIT data FIT-DATA. Here, the ROM 30 repeatedly works when electric power is supplied thereto.

The clock divider 10, as shown in FIG. 4, includes a divider-75 11 for counting a clock signal CLK into 75 signals at every data bit inputted, a divider-25 12 for dividing an inverted delay clock signal into 25 signals, a delay unit 13 for delaying the clock signal for a predetermined time, a NAND-gate NAND1 for NANDing the output signal and the inverted delay clock signal/CLKD outputted from the delay unit 13 and for generating an output enable signal/OE, an inverter IV3 for inverting the clock signal CLK, a NAND-gate NAND2 for NANDing the output signal and the delay clock signal CLKD outputted from the inverter IV3 and for generating a write enable signal/WE, an AND-gate AND for ANDing the carry signal RCO and the delay clock signal CLKD outputted from the divider-75 11, and a flip-flop 14 for outputting the output signal outputted from the divider-25 12 as a FIT signal output control signal in accordance with the output signal outputted from the AND-gate AND.

In addition, the delay unit 13 includes an inverter IN1 for inverting the clock signal CLK inputted, a delay unit of a resistor R and a condenser C for delaying the clock signal CLK inverted by the inverter IV1 for a predetermined time, and an inverter IV2 for inverting the clock signal CLK delayed by a predetermined time by the delay unit.

The control logic unit 40 includes a divider-25 41 for dividing the inverted delay clock signal/CLKD into 25 signals and for outputting the signal as a FIT clock signal FIT-CLK, a flip-flop 42 which is cleared in accordance with the control signal outputted from the clock divider 10 for outputting the signal outputted from the output terminal D7 of the ROM as a FIT synchronous signal FIT-SYNC in accordance with the clock signal outputted from the divider-25 41, and a flip-flop 43 which is preset in accordance with the control signal outputted from the clock divider 10 for outputting the transmission delay data RXD as a FIT data FIT-DATA in accordance with the clock signal of the divider-25 41.

Here, the delay clock signal CLK is the clock signal which is delayed for a predetermined time, and the inverted delay clock signal/CLKD is the delay clock signal CLKD which is inverted and inputted thereto, and the transmission delay data RXD is the transmission data RX which is delayed and inputted thereto.

Figure 1:
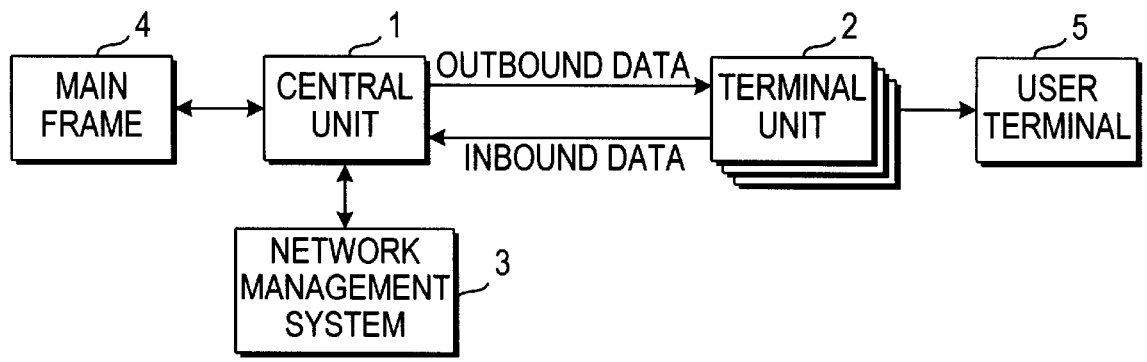
FIG. 1 is a block diagram illustrating a very small aperture terminal system.
Figure 2:
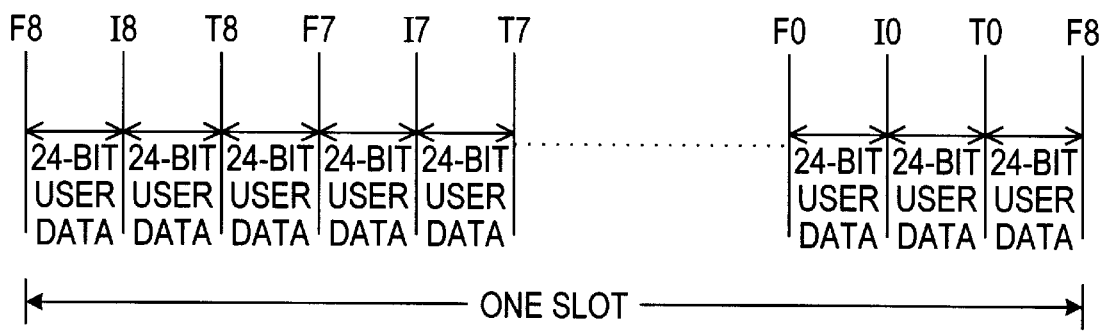
FIG. 2 is a view illustrating the construction of a bit signal of a framing identification and timing (FIT) signal according to the present invention.

As shown in FIG. 1, the data from the central unit 1 is inputted to the decoder of the terminal unit 2, and the clock signal CLK is extracted by the decoder and is inputted to the clock divider 10.

The frequency of the clock signal extracted by the decoder of the terminal unit 2 is 66.666 KHz which is obtained by a combination between 64 KHz which is a user data clock and 2.666 KHz which is a FIT clock signal.

Therefore, since there are 75 bits from the framing bits 0(F0) to the bit 1(F1), the divider-75 11 is needed for extracting the framing bit. In addition, the divider-75 11 is needed with respect to the identification bit I and the timing bit T.

The clock signal of 66.666 KHz extracted by the decoder of the terminal unit 2 is divided by the divider-75 11 of the clock divider 10, and the thusly divided output signals become address signals A0 through A7 of the RAM 20.

The clock signal CLK is inverted by the inverter IV3 and is applied to one input terminal of the NAND-gate NAND2 and is inverted by the inverter IV1 of the delay unit 13 and is delayed by the resistor R and the condenser C for about 10 seconds, and is inverted by the inverter IV2, and is applied to one input terminal of the NAND-gate NAND1.

In addition, since the inverted delay clock signal/CLKD is applied to the clock terminal CK of the divider-25 12, and is applied to another input terminal of the NAND-gate NAND1, the inverted delay clock signal/CLKD is NANDed by the signal delayed by and outputted from the delay unit 13 and is outputted as an output enable signal/OE of the RAM 20.

Since the delay clock signal CLKD is applied to another input terminal of the NAND-gate NAND2, and is NANDed by the clock signal CLK inverted by and outputted from the inverter IV3 and is outputted as an output enable signal/WE outputted from the RAM 20, the RAN 20 repeatedly performs the write enable operation and the output enable operation.

In addition, the carry signal RCO from the delay clock signal CLKD and the divider-75 11 are ANDed by the AND-gate AND and are applied to the clock terminal CK of the flip-flop 14 as a clock signal, and the signal divided into 25 signals by the divider-25 12 is applied to the input terminal D, a predetermined signal for controlling the output of the FIT signal is outputted through the output terminal Q and is applied to the ROM 30 as an address signal A8 and the control logic unit 40 as well.

Here, the carry signal RCO outputted from the divider-75 11 is a signal which is generated whenever the divider-75 11 finishes its dividing operation.

In the above state, since the transmission data RX is applied to the ROM 30 as an address signal A0, and the output signals D0 through D6 of the RAM 20 are applied to the ROM 30 as address signals Al through A7, and the control signal outputted from the clock divider 10 is applied to the ROM 30 as an address signal A8, the state value stored in the ROM 30 is varied and outputted in accordance with the address signals A0 through A8.

Namely, the state value (75 dividings=one channel) of each channel provided by the RAM 20 becomes the address input value of the ROM 30 and is detected by the same.

In more detail, since the state machine algorithm is stored in the ROM, when the output value of the RAM 20 is inputted, the output value thereof is designated as a corresponding value of the ROM 30, and when the value (an F bit value) which is designated by the central unit is inputted, a desired synchronization is obtained.

The address from the ROM 30 is restored into the RAM 20 before the next address signal is accessed, and is applied as the address signals A1 through A7 of the ROM 30, and the output value of the ROM 30 is restored in the RAM 20 in accordance with the address value A0 at each divider, respectively.

In addition, when the address signals A1 through A8 are inputted to the ROM 30, the sink bit D7, as shown in FIG. 5A, is generated at every one slot and is applied to the control logic unit 40.

The control logic unit 40 works as a synchronous block of the FIT channel, and the inverted delay clock signal/CLKD is divided into 25 signals, and is outputted as the FIT clock signal FIT-CLK as shown in FIG. 5B, and the FIT clock signal FIT-CLK is applied to the clock terminal CK of the flip-flops 42 and 43 as a clock signal.

In addition, the control signal outputted from the flip-flop 14 of the clock divider 10 is applied to the clear terminal/CLR of the flip-flop 42, and the preset terminal/PR of the flip-flop 43, respectively, and the sink bit D7 of the ROM 30 is outputted from the flip-flop 42 as a FIT synchronous signal FIT-SYNC.

Thereafter, the flip-flop 43 outputs the delay transmission data RXD as a FIT data FIT-DATA.

Namely, when the bits 8 (F8) of the framing pattern is contained in the transmission date RX, the ROM 30 outputs the FIT synchronous signal FIT-SYNC as shown in FIG. 5A through the flip-flop 42 of the control logic unit 40, and the FIT data FIT-DATE is restored into the divider-25 41 at every 25 data bits, and the identification bit I and the timing bit T are extracted from the FIT data FIT-DATA.

In addition, the FIT signal of 2.66 KHz extracted by the terminal unit is used for analyzing the 2.66 Kbps FIT data and for transmitting 64 Kbps data to the central unit as 64 KHz.

Namely, the FIT clock FIT-CLK from the control logic unit 40, as shown in FIG. 5C, is used for extracting each FIT signal in accordance with 25 dividings of the clock inputted.

Figure 6:
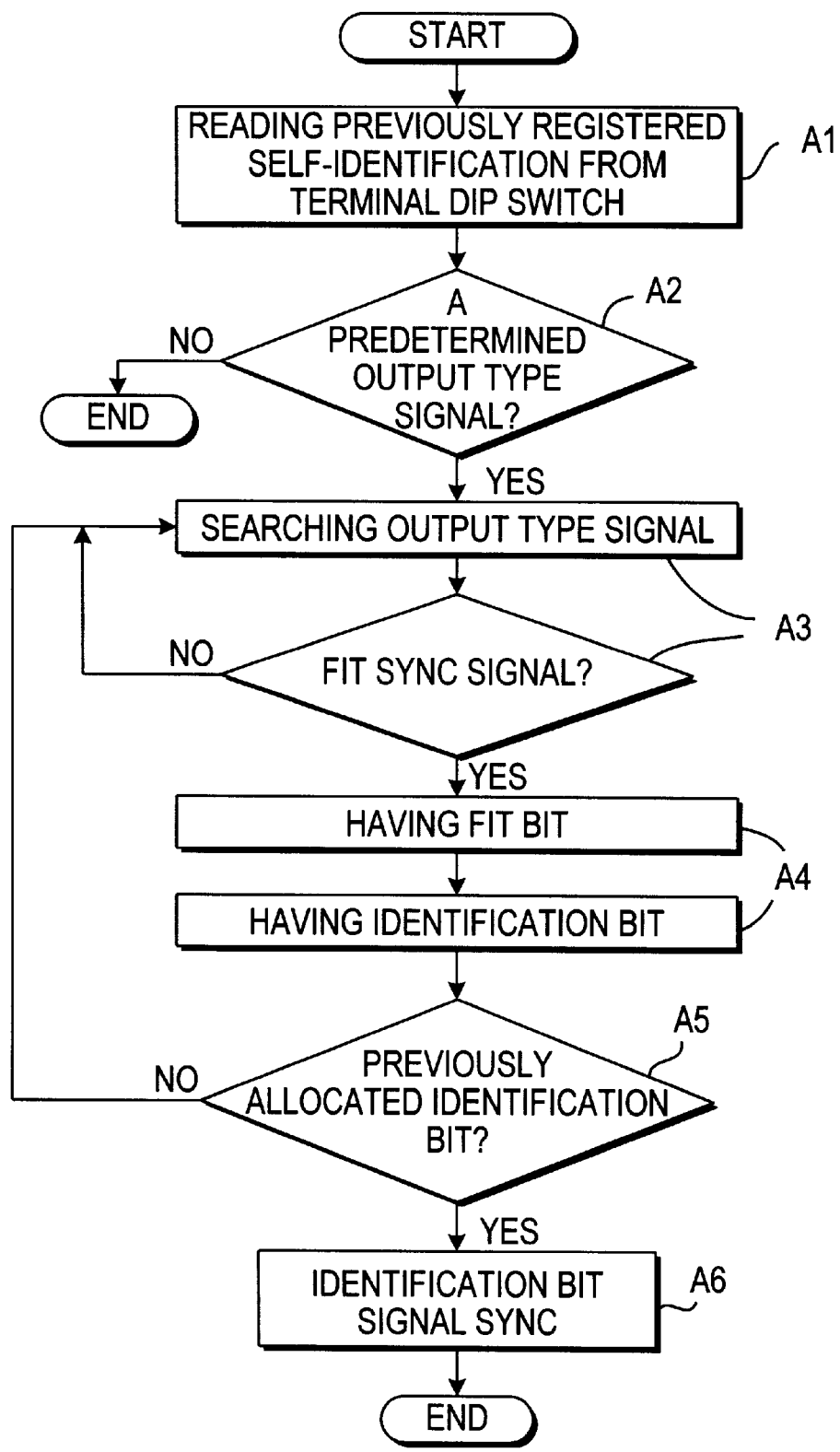
FIG. 6 is a flow chart illustrating an operation of a FIT signal extraction apparatus for a very small aperture terminal system according to the present invention.

The identification bit searching program for searching the identification bit by extracting the FIT signal is shown in FIG. 6.

The operation of the identification bit searching program includes a first step A1 for reading a corresponding identification number from a dip switch of the terminal unit 2, a second step A2 for judging whether a predetermined output type signal is outputted do as to judge whether a synchronous signal is outputted from the central unit 1 from output type signals when a predetermined terminal unit 2 is turned on, a third step A3 for terminating the operation when the output type signal is not outputted, for searching the FIT synchronous signal from the output type signals after searching the output type signals when the output type signal is present and for researching the output type signals when there is not a FIT synchronous signal upon searching the FIT synchronous signal from the output type signals, a fourth step A4 for searching the identification bit from the FIT synchronous signals when the FIT synchronous signal is present, a fifth step for judging whether the searched identification bit is the same as the identification bit previously set in a specific terminal unit 2 and for researching the output type signals when the identification is different, and a sixth step A6 for detecting the identification bit and synchronizing the signal when the identification is the same.

Meanwhile, the timing bit includes nine bits per one slot which are used for synchronizing the slot with respect to the entire terminal units 2 with respect to the slotted aloha.

The timing bit information is sequentially increased from 0 to 99, and the increase operation is repeated by one super frame, namely, 100 slot cycle.

In the case of the slotted aloha, each terminal unit 2 is provided with the slot number by witch it is possible to access from the network management system 3 of the central unit 1 through the initialization process.

Figure 7:
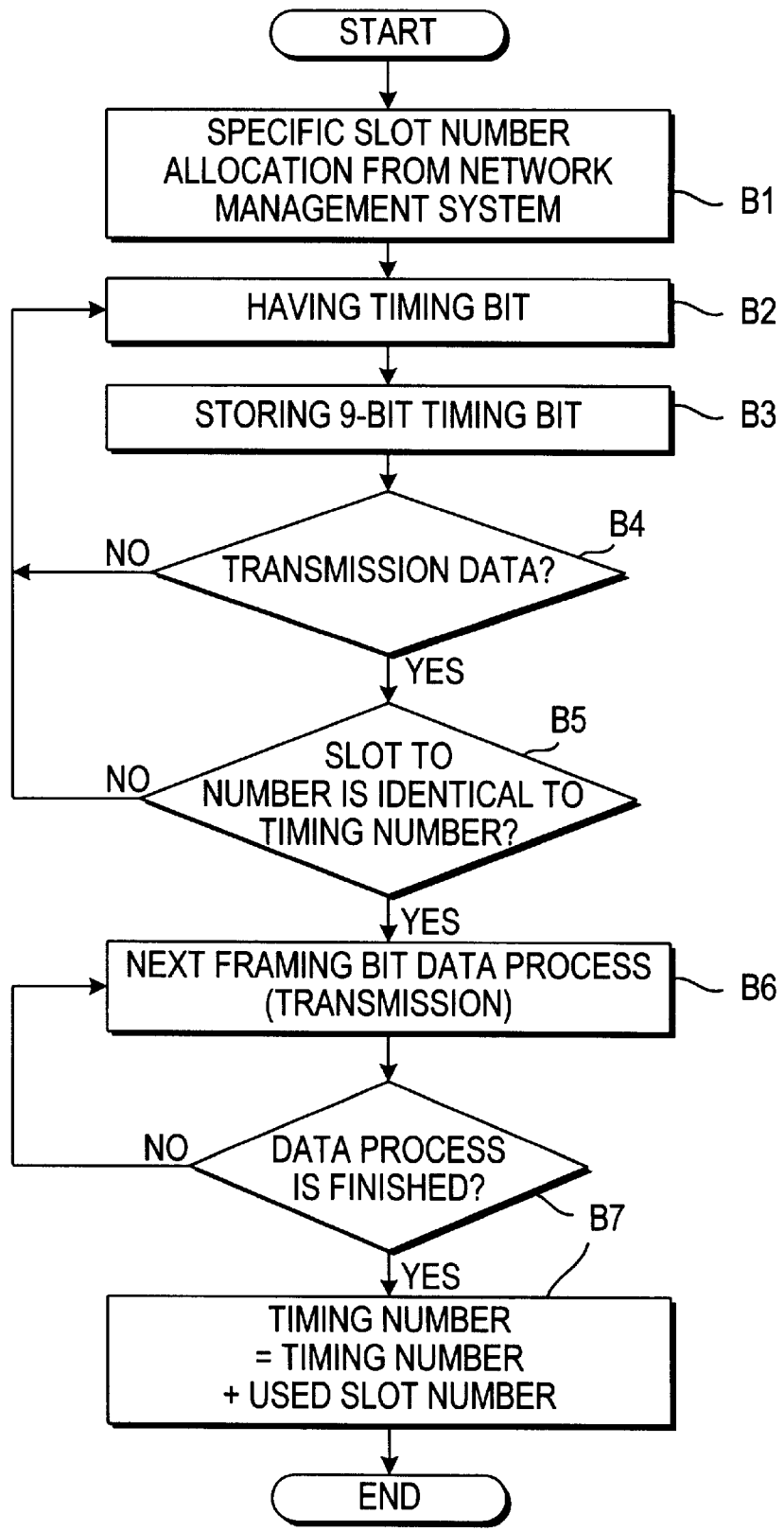
FIG. 7 is a flow chart illustrating another operation of a FIT signal extraction apparatus for a very small aperture terminal system according to the present invention.

FIG. 7 is a flow chart illustrating another operation of a FIT signal extraction apparatus for a very small aperture terminal system according to the present invention, which operation is performed through a timing synchronous processing program of the system with respect to the terminal unit 2 on the assumption that a specific terminal unit 2 is provided with slots of 1, 50, and 80 from the network management system 3.

This timing synchronous processing program includes a first step B1 that the terminal unit 2 receives a specific slot number from the network management system 3, a second step B2 for receiving a slot number and having a timing bit which is repeated at a cycle of 100 slots, in which the timing information is sequentially increased from 0 to 99, a third step B3 for storing the timing bit which is nine bits per one slot, a fourth step B4 for judging whether a transmission data is outputted from the central unit 1 after storing the timing bit and for receiving the timing bit again when the transmission data was not outputted, a fifth step B5 that the terminal unit 2 judges whether the slot number received from the network management system 3 is identical to the timing bit when the transmission data is outputted and for receiving the timing bit again when the slot number thereof is not identical to the timing bit, a sixth step for processing the next framing bit data when the slot number and the timing bit are identical, and a seventh step for storing a new timing bit, namely, the increased timing number, into the ROM 30 for a transmission with respect to the next data after the data processing upon judging whether the data processing is finished.

As a result, since the entire terminal units 2 having one output type has a specific slot number, the synchronization with respect to the slot is possible.

As described above, in the present invention, it is possible to directly extract the FIT signal from the user terminal and to use the same as a system synchronous signal.

In addition, it is possible to interconnect a plurality of user terminals and central units, for thus obtaining an accurate information transmission, and enhancing the performance of the communication, and the reliability of the system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A framing identification and timing signal extraction apparatus for a very small aperture terminal system, comprising:
   a clock signal divider for each dividing an input clock signal and an inverted delay clock signal into a predetermined number of signals to generate first and second dividing signals having a different frequency, generating an output enable signal and a write enable signal using the clock signal and a delay clock signal, and generating an output control signal for controlling output of a framing identification and timing (FIT) signal;
   a first memory for storing input data according to said first dividing signal and the write enable signal of the clock signal divider and outputting the stored data according to the output enable signal of the clock signal divider;
   a second memory for receiving the output data from the first memory, the control signal of the clock signal divider, and a transmission data as address signals, and outputting a corresponding state value to output a previously stored data according to the output data, the control signal and transmitted data; and
   a control logic unit for extracting a FIT synchronizing signal, FIT clock signal, and a FIT data in accordance with the output from the second memory and the control signal from the clock signal divider.

2. The apparatus of claim 1, wherein said clock signal divider is directed to dividing the clock signal into 75 signals.

3. The apparatus of claim 1, wherein the output signal from the flip-flop is outputted to one address terminal of the second memory.

4. The apparatus of claim 1, wherein the output signal from the second memory is restored into the first memory before the next address value is accessed.

5. A framing identification and timing signal extraction apparatus for a very small aperture terminal system, comprising:
   a clock signal divider for each dividing an input clock signal and an inverted delay clock signal into a predetermined number of signals to generate first and second dividing signals having a different frequency, generating an output enable signal and a write enable signal using the clock signal and a delay clock signal, and generating an output control signal for controlling output of a framing identification and timing (FIT) signal;
   a first memory for storing input data according to said first dividing signal and the write enable signal of the clock signal divider and outputting the stored data according to the output enable signal of the clock signal divider;
   a second memory for receiving the output data from the first memory, the control signal of the clock signal divider, and a transmission data as address signals, and outputting a corresponding state value to output a previously stored data according to the output data, the control signal and transmitted data; and
   a control logic unit for extracting a FIT synchronizing signal, FIT clock signal, and a FIT data in accordance with the output from the second memory and the control signal from the clock signal divider, wherein said clock divider includes:
   a divider-75 for dividing the clock signal into 75 signals;
   a divider-25 for dividing the inverted delay clock signal into 25 signals;
   a delay unit for delaying the clock signal for a predetermined time;
   a first NAND-gate for NANDing the output signal outputted from the delay unit and the inverted delay clock signal to generate the output enable signal;
   an inverter for inverting the clock signal;
   a second NAND-gate for NANDing the delay clock signal and the clock signal inverted by the inverter to generate the write enable signal;
   an AND-gate for ANDing the output signal outputted from the divider-75 and the delay clock signal; and
   a flip-flop for receiving the output signal outputted from the divider-25 in accordance with the output signal from the AND-gate and for outputting the output signal as the control signal for controlling output of the FIT signal.

6. The apparatus of claim 5, wherein said delay unit includes:
   a first inverter for inverting the clock signal;
   delay means for delaying the clock signal inverted by the first inverter for a predetermined time; and
   a second inverter for inverting the clock signal delayed by the delay means for a predetermined time to apply the inverted clock signal to the first NAND-gate.

7. The apparatus of claim 5, wherein the output signal from the first and second NAND-gates are applied to an output enable terminal and a write enable terminal of the first memory, respectively.

8. The apparatus of claim 5, wherein the output signal from the flip-flop is outputted to one address terminal of the second memory.

9. The apparatus of claim 5, wherein the output signal from the second memory is restored into the first memory before the next address value is accessed.

10. A framing identification and timing signal extraction apparatus for a very small aperture terminal system, comprising:

a clock signal divider for each dividing an input clock signal and an inverted delay clock signal into a predetermined number of signals to generate first and second dividing signals having a different frequency, generating an output enable signal and a write enable signal using the clock signal and a delay clock signal, and generating an output control signal for controlling output of a framing identification and timing (FIT) signal;

a first memory for storing input data according to said first dividing signal and the write enable signal of tile clock signal divider and outputting the stored data according to the output enable signal of the clock signal divider;

a second memory for receiving the output data from the first memory, the control signal of the clock signal divider, and a transmission data as address signals, and outputting a corresponding state value to output a previously stored data according to the output data, the control signal and transmitted data; and a control logic unit for extracting a FIT synchronizing signal, FIT clock signal, and a FIT data in accordance with the output from the second memory and the control signal from the clock signal divider; wherein said control logic unit includes:

a divider for dividing the inverted delay clock signal into a predetermined frequency signal to generate an FIT clock signal when an output signal from the second memory is partially inputted thereto;

a second flip-flop for outputting the output signal from the second memory as the FIT synchronous signal by using the FIT clock signal from the divider; and a third flip-flop for the delay transmission data as a FIT data by using the FIT clock signal from the divider as a clock signal.

11. The apparatus of claim 10, wherein said divider is directed to dividing the clock signal into 25 signals.

12. The apparatus of claims 10, whwerein the control signal from the clock signal divider is applied to a clear terminal and a preset terminal of the second and third flip-flop, respectively.

13. A framing identification and timing (FIT) signal extraction method for a very small aperture terminal system, comprising the steps of:

extracting a FIT signal which is three sub-channels which were generated by a central unit so that the communication synchronization between the central unit and a terminal station is performed;

searching an identification bit from the FIT signal extracted; and synchronizing the timing from the FIT signal extracted; wherein said identification bit searching step includes:

reading a previously identification number from a dip switch of the terminal unit;

judging whether a predetermined output type signal is outputted so as to judge whether a synchronous signal is outputted among the output type signals from the central unit when a predetermined terminal unit is turned on;

searching an output type signal when the output type signal is present and a FIT synchronous signal from the output type signals;

searching the output type signal when the FIT synchronous signal was not outputted and the FIT synchronous signal from the output type signal;

searching the output type signal when the FIT synchronous signal was not outputted and an identification bit from the FIT synchronous signal when the FIT synchronous signal is outputted; and judging whether the identification bit searched is identical to a previously set identification and checking a predetermined identification bit when the identification signal is identical for a synchronization period.

14. A framing identification and timing (FIT) signal extraction method for a very small aperture terminal system, comprising the steps of:

extracting a FIT signal which is three sub-channels which were generated by a central unit so that the communication synchronization between the central unit and a terminal station is performed;

searching an identification bit from the FIT signal extracted; and synchronizing the timing from the FIT signal extracted; wherein said timing synchronous step includes the sub-steps of:

a first sub-step that the terminal unit receives a slot from the central unit and a receives a specific slot number when the slot is identical to the timing;

a second sub-step for receiving a slot number and having a timing but which is sequentially increased from 0 to 99, with the timing bit being repeated at 100 slots;

a third sub-step for storing the timing bit for storing a timing bit of 9 bits corresponding to one slot and judging whether a transmission data is outputted from the central unit;

a forth sub-step for comparing the slot number and the timing bit when the transmission data is outputted;

a fifth sub-step for processing a data from the next frame information of the synchronous information contained in the FIT signal when the slot number and the timing bit are identical; and a sixth step for storing a new timing bit and an increased timing number for the next data transmission when the data process is finished.

15. The method of claim 14, further including a step for receiving a timing bit again when there is not a transmission data, or the slot number and the timing bit are not identical.

* * * * *

UNITED STATES PATENT AND TRADEMARK OFFICE
CERTIFICATE OF CORRECTION

PATENT NO. : 6,047,003
DATED : April 4, 2000
INVENTOR(S) : Byong-Eun HAN

It is certified that error appears in the above-identified patent and that said Letters Patent is hereby corrected as shown below:

In claim 10, column 9, line 24, change "tile" to --the--.

In claim 12, column 9, line 51, change "claims 10, whwerein" to --claim 10, wherein--.

Signed and Sealed this

Twentieth Day of March, 2001

Attest:

NICHOLAS P. GODICI

Attesting Officer

Acting Director of the United States Patent and Trademark Office